United States Patent [19]  [11] 4,346,801
Redder et al.  [45] Aug. 31, 1982

[54] LUBRICATING SPROCKET DRUM MOUNTING

[75] Inventors: Manfred Redder, Bergkamen-Oberaden; Dieter Grundken, Lunen, both of Fed. Rep. of Germany

[73] Assignee: Gewerkschaft Eisenhutte Westfalia, Lunen, Fed. Rep. of Germany

[21] Appl. No.: 158,044

[22] Filed: Jun. 10, 1980

[51] Int. Cl.³ .............................................. B65G 45/02
[52] U.S. Cl. ..................................... 198/500; 277/29; 277/74; 308/187
[58] Field of Search ................ 198/500, 501; 308/187, 308/18, 20; 277/29, 74

[56] References Cited

U.S. PATENT DOCUMENTS 2,770,506 11/1956 Derner ................................. 308/187
3,021,182 2/1962 Schnacke ........................... 308/187

FOREIGN PATENT DOCUMENTS 2327852 12/1974 Fed. Rep. of Germany .

Primary Examiner—Jeffrey V. Nase
Attorney, Agent, or Firm—Sughrue, Mion, Zinn, Macpeak & Seas

[57] ABSTRACT

A scraper-chain conveyor sprocket drum is rotatably mounted in a drive frame by means of roller bearings at each end of the sprocket drum. A respective slide ring seal is provided between each bearing and the adjacent end of the sprocket drum. Lubricant is supplied to both bearings and both seals, a respective lubricant path being provided for the bearing and seal at each end of the sprocket drum. Each lubricant path includes a lubricant supply passage leading to a bearing space surrounding the respective bearing, and a lubricant discharge path leading from a seal space surrounding the respective seal, each seal space being connected to the associated bearing space.

15 Claims, 1 Drawing Figure

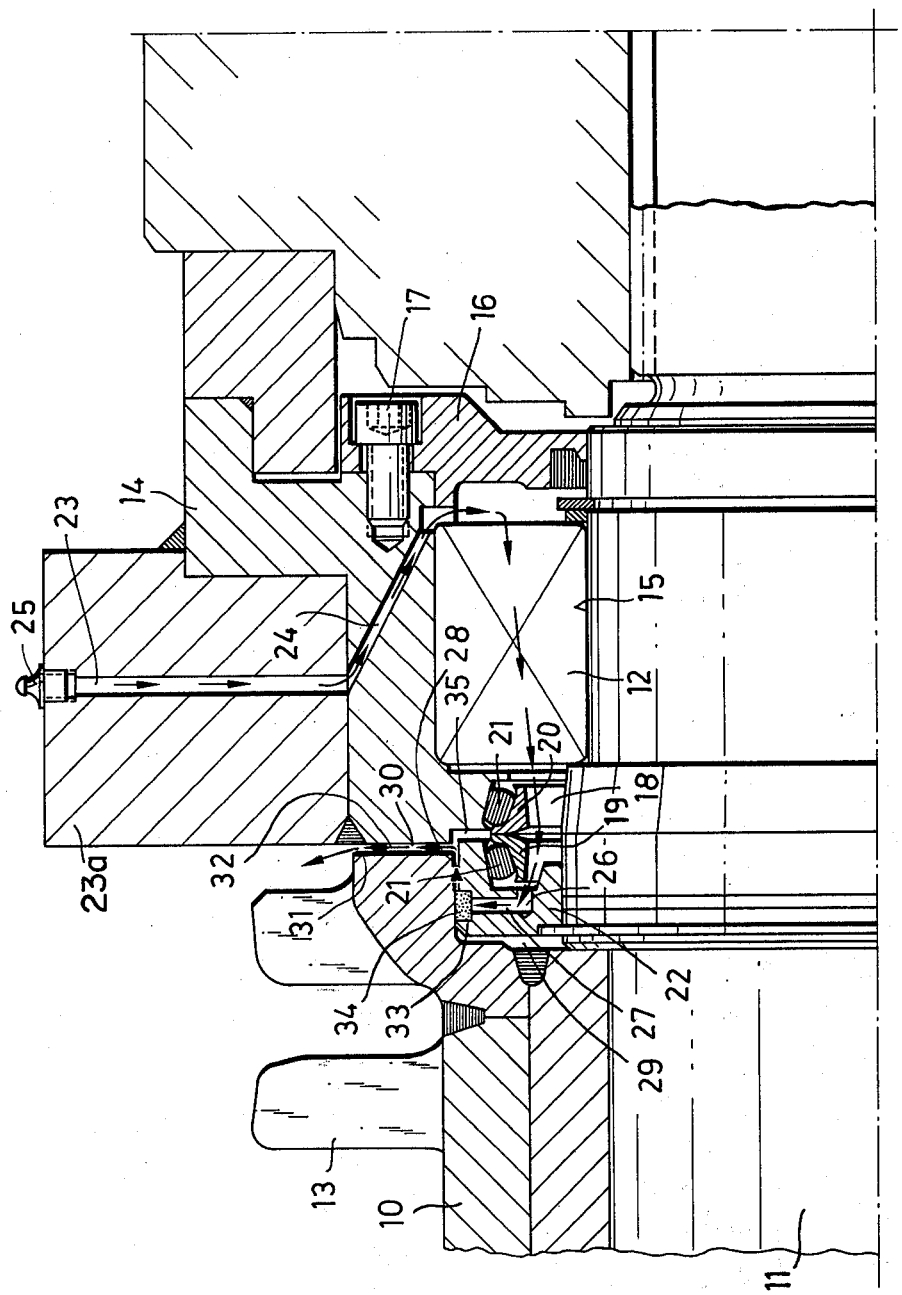

LUBRICATING SPROCKET DRUM MOUNTING

BACKGROUND TO THE INVENTION

This invention relates to means for mounting a sprocket drum for driving a scraper assembly of a scraper-chain conveyor, and to a drive arrangement for such a scraper assembly. In particular, the invention is concerned with the lubrication of sprocket drum mounting means.

Scraper-chain conveyors are used in mine workings for removing won mineral material (such as coal) from the face area. The scraper assembly of such a conveyor is driven by a sprocket drum mounted in a drive frame at one end of the conveyor. A similar sprocket drum and drive frame is provided at the other end of the conveyor, and this second sprocket drum can form part of an auxiliary drive or be an idler sprocket drum. The drive motor and gearing for a driven sprocket drum is attached to the associated drive frame by flanging.

In order to seal the annular gaps between the end faces of a sprocket drum and the adjacent stationary members (such as the side plates of the drive frame), use is made of slide ring seals. A slide ring seal (or "lifetime" seal) has a pair of relatively-rotatable, contacting metal rings which are held in sealing and sliding contact by resilient rings. In order to lubricate such a seal, the seal space surrounding the seal is connected to the bearing space surrounding an adjacent roller bearing which is used for rotatably supporting the sprocket drum in the drive frame. Lubricant can, therefore, be forced into the seal space via the bearing space. In this arrangement, the bearing space is provided with a lubricant supply passage and a lubricant discharge passage, the lubricant discharge passage leading directly away from the bearing space. Thus, a closed-circuit lubricant path is formed by the lubricant supply passage, the bearing space and the lubricant discharge passage, so that fresh lubricant supplied via the lubricant supply passage flushes out old lubricant from the bearing via the lubricant discharge passage. Unfortunately, the seal space is supplied with lubricant via a "dead-end" branch passage leading from the bearing space, so that fresh lubricant cannot be supplied to the seal. (See DE-OS No. 2 327 852).

SUMMARY OF THE INVENTION

According to one aspect of the invention there is provided means for mounting a sprocket down for driving a scraper assembly of a scraper-chain conveyor, the mounting means comprising a bearing for rotatably supporting the sprocket drum in a conveyor drive frame, and a seal located between the bearing and the sprocket drum, the seal having relatively movable parts, means being provided for supplying lubricant to the bearing and to the seal, wherein the lubricant supply means includes a lubricant path which passes through both the bearing and the seal.

The present invention also provides means for mounting a sprocket drum for driving a scraper assembly of a scraper-chain conveyor, the mounting means comprising two bearings for rotatably supporting the sprocket drum in a conveyor drive frame, and two seals each having relatively movable parts, the bearings being located at the ends of the sprocket drum, and each seal being located between a respective bearing and the adjacent end of the sprocket drum, means being provided for supplying lubricant to the bearings and the seals, wherein the lubricant supply means includes a respective lubricant path for the bearing and the seal at each end of the sprocket drum, each lubricant path passing through both its bearing and its seal.

Since the or each lubricant path passes through both its bearing and its seal, freshly supplied lubricant will flush out old lubricant from both that bearing and that seal. Consequently, lubrication of this type of mounting means is more efficient than with known mounting means, this increase in lubricating efficiency being achieved with only minimal increase in cost. The flushing-out of old lubricant from the seals also helps to prevent the ingress of foreign matter (such as coal dust).

Advantageously, the or each seal is axially-aligned with, and adjacent to, its respective bearing, and the or each bearing is a roller bearing. Preferably, the or each seal is a slide ring seal having a pair of relatively-rotatable, contacting, slide rings which are made of metal.

The present invention further provides a drive arrangement for transferring drive to a scraper assembly of a scraper-chain conveyor, the drive arrangement comprising a drivable sprocket drum rotatably mounted in a drive frame by two bearings, the bearings being located at the ends of the sprocket drum, a respective seal being located between each bearing and the adjacent end of the sprocket drum, each seal having relatively movable parts, means being provided for supplying lubricant to the bearings and the seals, wherein the lubricant supply means includes a respective lubricant path for the bearing and the seal at each end of the sprocket drum, each lubricant path passing through both its bearing and its seal.

Advantageously, each seal is axially-aligned with, and adjacent to, its respective bearing, and each bearing is a roller bearing. Conveniently, each bearing is mounted in a respective bearing housing attached to the drive frame.

Preferably, each lubricant path is such that the respective bearing is upstream of the respective seal. In this case, each bearing housing may be provided with a lubricant supply passage leading towards the associated bearing. Moreover, each bearing may be surrounded by a bearing space, each seal may be surrounded by a seal space, in which case each bearing space communicates with the seal space of the adjacent seal.

Advantageously, each seal is a slide ring seal having a pair of contacting metal slide rings, one ring of each pair being attached to the adjacent end of the sprocket drum, the other ring of that pair being attached to a respective stationary member attached to the drive frame. Preferably, each said one slide ring is arranged within a respective support ring which is fitted within a groove machined in the adjacent end face of the sprocket drum, and each said other slide ring is fitted in a groove machined in the adjacent bearing housing, the bearing housings constituting said stationary members.

Each lubricant path may include a lubricant discharge passage leading away from the respective seal. Advantageously, each lubricant discharge passage includes axial channels in the respective support ring, radial channels in said support ring, an axial gap formed between the outer periphery of said support ring and an inner surface of the respective groove machined in the adjacent end face of the sprocket drum, and a radial gap formed between said end face of the sprocket drum and the adjacent end face of the respective bearing housing. These channels and gaps constitute a kind of labyrinth seal, and so provide increased protection against the ingress of foreign matter.

Each lubricant discharge passage may be provided with a resilient closure member, the closure member being resiliently deformable by the lubricant pressure to open the lubricant discharge passage when the lubricant pressure acting on the closure member reaches a predetermined level. Advantageously, each resilient closure member is a closure ring made of plastics material, such as foamed polyurethane. Preferably, each closure member is pre-stressed and held in an annular groove formed in the support ring. The provision of the resilient closure members enables new lubricant to be added even when the conveyor is working. Previously, lubricant discharge passages were closed by screw-threaded members, which could only be removed safely once the conveyor had been stopped. Another advantage which accrues from the use of the resilient closure members, is that they act as additional barriers against the ingress of foreign matter.

BRIEF DESCRIPTION OF THE DRAWING

The invention will now be described in greater detail, by way of example, with reference to the accompanying drawing, the single FIGURE of which is an axial section through one end of a conveyor sprocket drum incorporating mounting means constructed in accordance with the invention.

DESCRIPTION OF PREFERRED EMBODIMENT

Referring to the drawing, a sprocket drum 10 for driving a scraper-chain conveyor (not shown) is mounted in a drive frame (not shown) at one end of the conveyor. As is known, the sprocket drum 10 is constituted by two, generally semi-tubular parts, which are bolted together to form the tubular drum. The sprocket drum 10 is drivably attached by, for example, splines (not shown) to a drive shaft 11. The drive shaft 11 extends axially beyond the ends of the sprocket drum 10, and is rotatably mounted in the drive frame by means of roller bearings 12 (only one of which can be seen in the drawing). The sprocket drum 10 has a pair of outboard sprockets 13 (only one of which can be seen in the drawing), for driving the two outboard chains of a double-chain scraper assembly.

As is usual, the sprocket drum 10 is mounted between the vertical side-plates (not shown) of the drive frame. Each roller bearing 12 is mounted within a bearing space 15 formed within a bearing housing 14, which is fitted in an aperture in the respective drive frame side plate. The bearing housings 14 each have a generally L-shaped cross-section. The outer axial end of each bearing space 15 is closed-off by means of a respective closure plate 16. Each closure plate 16 is secured to its respective bearing housing 14 by means of bolts 17.

In order to seal the gaps between the ends of the rotatable sprocket drum 10 and the adjacent stationary parts of the drive frame, slide ring seals are provided in the annular spaces 18 formed between the ends of the sprocket drum and the bearings 12. Each slide ring seal (only one of which can be seen in the drawing) has a pair of contacting, relatively-rotatable, metal slide rings 19 and 20 mounted in the respective annular space 18.

As the bearing/slide ring seal arrangements are indentical, only one of them will be described in detail. The slide rings 19 and 20 are forced into sliding and sealing contact by resilient rings 21, which are made of rubber or plastics material. The slide ring 20 is mounted in an annular groove machined in the end face of the bearing house 14. Similarly, the slide ring 19 is mounted in an annular groove machined in a support ring 22 which is rigidly attached to the sprocket drum 10 within a groove 29 machined in the end face of the drum. The plane of contact between the two slide rings 19 and 20 is slightly off-set from the plane of the end-face of the sprocket drum 10 towards the roller bearing 12. Alternatively, the plane of contact could coincide with the plane of the end-face of the sprocket drum 10, or even be slightly off-set away from the roller bearing 12.

The bearing space 15, which accommodates the roller bearing 12 and is formed in the fixed bearing housing 14, is connected, via an inclined channel 24, to a radial channel 23, the inclined channel entering the bearing space at that side of the bearing remote from the slide ring seal. The radial channel 23 passes through a drive frame member 23a (which could be a side plate of the drive frame or a member attached thereto), and terminates at a lubrication nipple 25. The inclined channel 24 passes through the bearing housing 14. The channels 23 and 24 define a lubricant supply channel.

The annular space 18 accommodating the slide ring seal communicates with the bearing space 15. The annular space 18 also communicates with the outside via inner axial channels 26, adjoining radial channels 27, an axially-extending annular gap 28, and a radially-extending annular gap 30. The channels 26 and 27 are formed in the support ring 22, the annular gap 28 is formed between the outer periphery of the support ring 22 and the cylindrical inner surface of the machined groove 29, and the annular gap 30 is formed between the end face 31 of the sprocket drum 10 and the opposing end face 32 of the bearing housing 14. The channels 26 and 27 and the gaps 28 and 30 define a lubricant discharge channel. Consequently, a closed-circuit lubricant path is defined, between the nipple 25 and the exit of the gap 30, by the channel 23, the channel 24, the bearing space 15, the annular space 18, the axial channels 26, the radial channels 27, the annular gap 28, and the annular gap 30. This lubricant path is shown by the arrows in the drawing.

A pre-stressed, resilient ring 34 made of plastics material is fitted in an annular groove 33 formed in the support ring 22, the ring 34 covering the exits of the radial channels 27. Preferably, the ring 34 is made of a foamed plastics material such as foamed polyurethane.

In order to lubricate the roller bearing 12 and the adjacent slide ring seal, a grease gun is applied to the nipple 25, and grease (lubricant) is pumped into the channel 23. This grease is pressed along the channels 23 and 24, and into the bearing space 15, so as to supply fresh lubricant to the roller bearing 12. The lubricant also passes through the bearing space 15, and into the annular space 18, so as to supply fresh lubricant to the slide ring seal. As this happens, some of the lubricant is forced into the channels 26 and 27. The pressure of this lubricant deforms the ring 34, so that lubricant can pass into the annular gap 28. This ensures that all the old lubricant is forced out of the lubricant path, and is replaced by fresh lubricant. Since the annular space 18 is "in series" with the bearing space 15, each fresh supply of lubricant reaches the slide ring seal as well as the roller bearing 12. Moreover, the annular gap 35 between the end faces of the support ring 22 and the bearing housing 14 also communicates with the annular gap 30, via the annular gap 38, so that the gap 35 is also filled with fresh lubricant following each operation of the grease gun.

We claim:

1. A drive arrangement for transferring drive to a scraper assembly of a scraper-chain conveyor, the drive arrangement comprising a drivable sprocket drum rotatably mounted in a drive frame by two bearings, the bearings being individually located in housings at the ends of the sprocket drum, a respective seal being located between each bearing and the adjacent end of the sprocket drum, each seal having at least two relatively movable parts, means being provided for supplying lubricant to the bearings and the seals, wherein the lubricant supply means includes a respective lubricant path for the bearing and the seal at each end of the sprocket drum, each lubricant path passing through both its bearing and its seal, wherein each lubricant path includes a lubricant discharge passage leading away from the respective seal, and wherein each lubricant discharge passage includes a radial gap formed between an end face of the sprocket drum and an adjacent end face of the respective bearing housing, and axial channels in a respective support ring, radial channels in said support ring, and an axial gap formed between the outer periphery of said support ring and an inner surface of a respective groove machined in the adjacent end face of the sprocket drum.

2. A drive arrangement according to claim 1, wherein each seal is axially-aligned with, and adjacent to, its respective bearing.

3. A drive arrangement according to claim 1, wherein each bearing is a roller bearing.

4. A drive arrangement according to claim 1, wherein each bearing housing is attached to the drive frame.

5. A drive arrangement according to claim 4, wherein each lubricant path is such that the respective bearing is upstream of the respective seal.

6. A drive arrangement according to claim 5, wherein each bearing housing is provided with a lubricant supply passage leading towards the associated bearing.

7. A drive arrangement according to claim 5, wherein each bearing is surrounded by a bearing space, and each seal is surrounded by a seal space, and wherein each bearing space communicates with the seal space of the adjacent seal.

8. A drive arrangement according to claim 4 or claim 5, wherein each seal is a slide ring seal having a pair of contacting metal slide rings, one ring of each pair bearing attached to the adjacent end of the sprocket drum, the other ring of that pair being attached to a respective stationary member attached to the drive frame.

9. A drive arrangement according to claim 8, wherein each said one slide ring is arranged within a respective support ring which is fitted within a groove machined in the adjacent end face of the sprocket drum.

10. A drive arrangement according to claim 8, wherein each said other slide ring is fitted in a groove machined in the adjacent bearing housing, the bearing housings constituting said stationary members.

11. A drive arrangement according to claim 1, wherein each lubricant discharge passage is provided with a resilient closure member, the closure member being resiliently deformable by the lubricant pressure to open the lubricant discharge passage when the lubricant pressure acting on the closure member reaches a predetermined level.

12. A drive arrangement according to claim 11, wherein each resilient closure member is a closure ring made of plastics material.

13. A drive arrangement according to claim 12, wherein each closure member is made of foamed polyurethane.

14. A drive arrangement according to claim 12, wherein each closure member is pre-stressed and held in an annular groove formed in the support ring.

15. A drive arrangement according to claim 1, wherein the sprocket drum surrounds, and is attached to, a sprocket shaft, the sprocket shaft being rotatably supported in the drive frame by the bearings.

* * * * *